United States Patent [19]
Carre

[11] 3,811,738
[45] May 21, 1974

[54] BRAKING PRESSURE REGULATING DEVICE FOR A VEHICLE

[75] Inventor: Jean-Jacques Carre, Montreuil, France

[73] Assignee: Societe Anonyme D.B.A., Paris, France

[22] Filed: Jan. 24, 1973

[21] Appl. No.: 326,349

[30] Foreign Application Priority Data
Feb. 2, 1972  France ............................. 72.03247

[52] U.S. Cl. ............................... 303/22 R, 188/195
[51] Int. Cl. .............................................. B60t 8/18
[58] Field of Search ................ 303/22, 23, 6 C, 6 R; 188/195, 349

[56] References Cited
UNITED STATES PATENTS

| | | | |
|---|---|---|---|
| 3,731,981 | 5/1973 | Bueler | 303/22 R |
| 3,362,758 | 1/1968 | Goerke et al. | 303/22 R |
| 3,503,657 | 3/1970 | MacDuff | 303/6 C |
| 3,379,479 | 4/1968 | Lepelletier | 303/22 R |

*Primary Examiner*—Duane A. Reger
*Assistant Examiner*—D. C. Butler
*Attorney, Agent, or Firm*—Ken C. Decker; William N. Antonis

[57] ABSTRACT

A device for regulating braking pressure, for example for controlling the rate of pressure rise in some of the brakes of a vehicle under varying load conditions of the vehicle. The device includes a pressure correcting valve adapted to be connected to the sprung part of the vehicle and a force transmitting mechanism adapted to be connected to the chassis. This mechanism is composed of two levers interconnected by draw springs. One of the levers, when at rest, engages an abutment fixed relative to the housing of the correcting valve. The other lever exerts a force on the movable member of the valve.

4 Claims, 3 Drawing Figures

3,811,738

BRAKING PRESSURE REGULATING DEVICE FOR A VEHICLE

SUMMARY OF THE INVENTION

The invention relates to a device for regulating braking pressure for a vehicle, suitable, for example, for controlling the rate of pressure rise in some of the vehicle brakes in accordance with variations in the distribution of static and dynamic loads on the axles of the vehicle.

A known regulating device has a fixed portion attached to the chassis and a portion movable relative to the chassis, the regulating device comprising a pressure correcting valve whose body is mounted on one of the said vehicle portions and whose operating characteristics depend on a variable force acting on a movable member of the valve and generated by the relative motions of the said vehicle portions.

An object of the invention is to provide a simple force transmitting mechanism which makes it possible for the vehicle suspension to accommodate the variations between the angular motion of the suspension and the reaction force of the movable valve member, so as to improve regulation of the braking pressure.

According to the invention, the device comprises a force transmitting mechanism comprising a first lever which is pivotable on an anchoring member fixed relative to the portion attached to the valve body, has one end cooperating with the other vehicle portion and is connected by means of at least one draw spring to a second lever which in turn is pivoted on another anchoring member fixed relative to the portion attached to the valve body and of which one end cooperates with the movable member of the valve.

Preferably, the lever, when at rest, engages an abutment fixed relative to the valve body, the draw spring exerting on the movable valve member by way of the second lever a predetermined force corresponding to a no-load threshold pressure of the vehicle's braking circuit.

BRIEF OF THE DRAWINGS

The invention will now be described by way of example with reference to the accompanying drawings in which:

FIG. 1 is a cross-sectional view of a regulating device embodying the invention;

FIG. 2 shows the device illustrated in FIG. 1, as seen in the direction of arrows 2—2; and FIG. 3 is a perspective view, in the direction of an arrow 3, of the force transmitting mechanism mounted on the device shown in FIGS. 1 and 2.

DETAILED DESCRIPTION OF A PREFERRED EMBODIMENT

Figure 1:
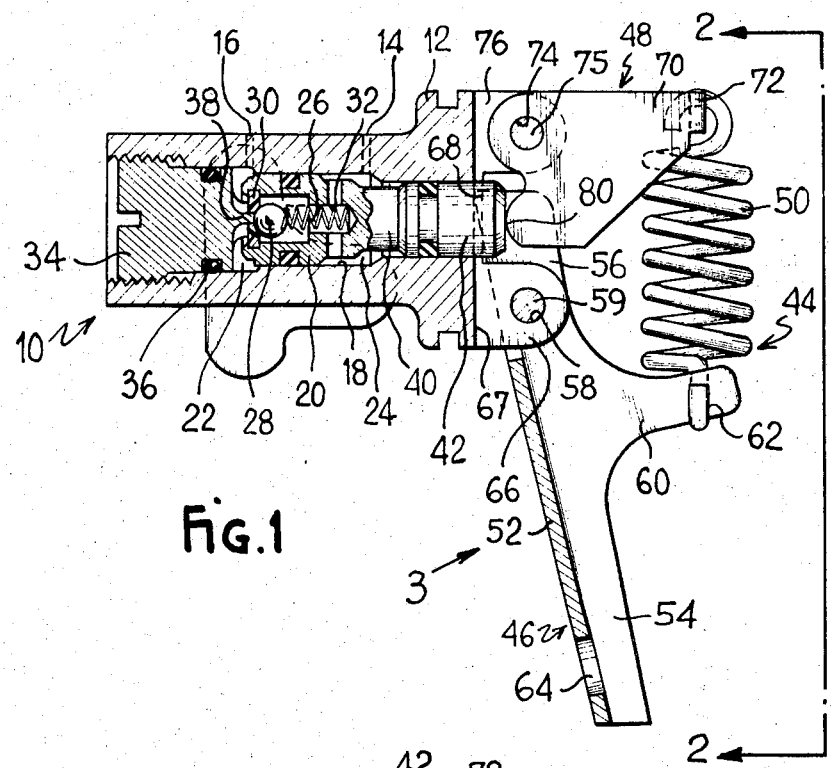
Figure 2:
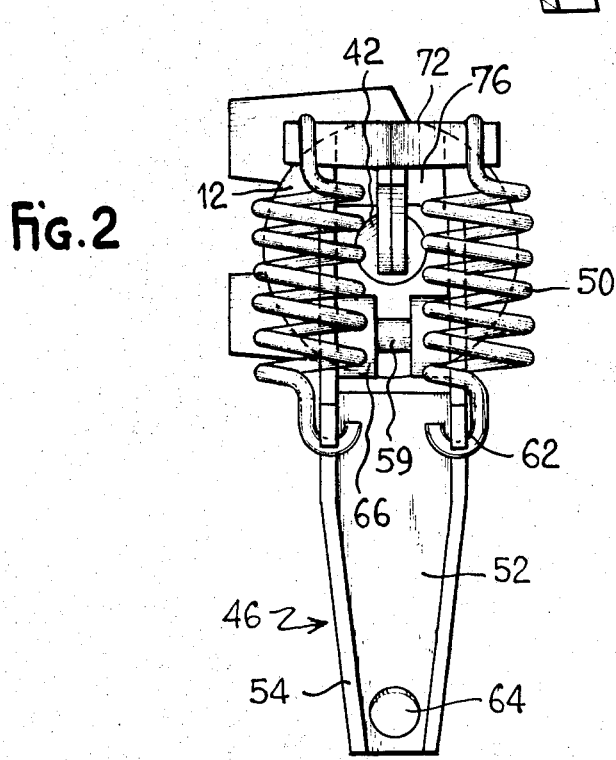

In the figures reference 10 designates a braking-pressure correcting valve suitably fixed to the chassis (not shown) of a motor vehicle. The valve 10 has a body 12 whose inlet orifice is connected to a source of fluid pressure such as a master cylinder (not shown), and whose outlet orifice 16 is connected to fluid pressure receiving means such as a set of brake actuators (not shown). To facilitate understanding of the operation of the device, the orifices 14, 16 are shown diagrammatically in FIG. 1 by means of broken lines. The orifices 14, 16 lead into respective ends of a bore 18 divided into two chambers 22, 24 by a piston 20. A duct 26 in the piston 20 permits fluid communication between the chambers 22, 24, and a ball 28 can close this communication by cooperating with a seat 30 attached to the piston 20. The ball 28 is biased resiliently towards its seat 30 by a spring 32. The chamber 22 is closed by a setscrew 34, fluid tightness being ensured by a seal 36 mounted on the screw 34 and cooperating with the bore 18. A projection 38 on the setscrew 34 extends into the chamber 22 and is engageable with the ball 28. The projection 38 is adapted to drive the ball 28 off its seat, so that the chambers 22 and 24 communicate. The piston 20 is connected to a rod 40 whose end 42 projects out of the valve body. Such valves are well known in the art and need not be described in detail. It suffice to say that the valve formed by the ball 28 and its seat 30 is subjected to a variable reaction force transmitted by the rod 40, and to the pressure forces in the bore 18, so as to modulate the passage of fluid between the orifices 14, 16 when the fluid pressure at the inlet orifice 14 reaches a predetermined value, hereinafter termed the threshold pressure.

The ball valve 10 shown in the figures is given solely by way of example, and the invention is applicable to any known type of braking-pressure correcting valve whose operating characteristics depend on a variable reaction force transmitted to a movable valve member.

Figure 3:
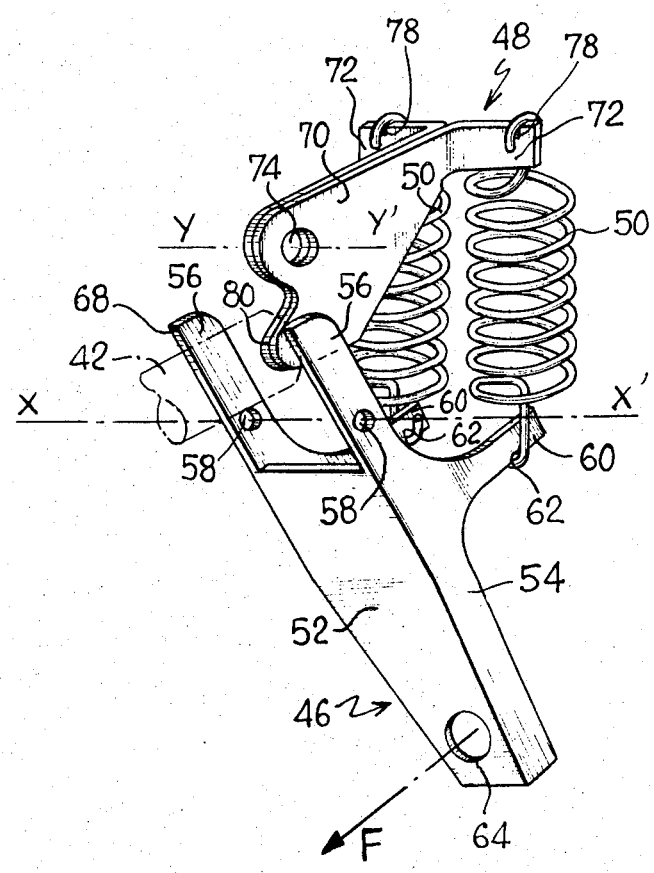

The invention relates more particularly to a force transmitting mechanism 44 comprising a first lever 46 capable of pivoting about an axis XX' (FIG. 3) perpendicular to the axis of the bore 18, and a second lever 48 capable of pivoting about an axis YY' parallel to the axis XX'. The levers 46, 48 are interconnected by two parallel draw springs 50. The lever 46 comprises a metal plate pressed into the shape of a U with a flat web 52 and two flanged edges 54. Extensions 56 of the edges 54, beyond the web 52, have holes 58 coaxial with the axis XX', and capable of receiving a pivot pin 59. The edges 54 also bear two projections 60 subsantially perpendicular to the extensions 56 and containing notches 62 for positioning the springs 50. A hole 64 in the bottom of the web 52 is provided for connecting the lever 46, for example by means of a cable, to a vehicle portion movable relative to the chassis. The lever 46 is pivotable about the pivot pin 59 on the axis XX', this pin being supported by two anchoring arms 66. The anchoring arms 66 are integral with or attached to the face 67 of the valve body and arranged symmetrically relative to the plane of symmetry of the lever 46, on either side of the rod 40.

The lever 48 comprises two metal plates having a flat web 70 and a tab 72 substantially at right-angles to the web 70. The two webs 70 are welded together to give a plane of symmetry to the lever 48, which is placed so that this plane of symmetry coincides with that of the lever 46. The lever 48 has a hole 74 on the axis YY' and is rotatable about a pivot pin 75 on this axis, the pin being supported by an anchoring member 76. This anchoring member 76 is integral with or attached to the face 67 of the valve body 12 and consists of two lugs disposed on either side of the lever 48. The tabs 72 of the lever 48 have respective notches 78 to position the springs 50. Respective rounded portions 80 of the webs 70 cooperate with the end 42 of the piston rod 40.

It will be understood that the valve body 12 may be mounted on part of the vehicle suspension, and the lever 46 may cooperate with a connecting member attached to the vehicle chassis.

The device described above operates as follows.

Under minimum vehicle loading conditions, the ends 68 of the lever 46 abut on the valve body 12. The rod 40 is then subjected to a force generated by the springs 50 and transmitted by the lever 48. Initial regulation is carried out on the valve itself by means of the screw 34 to give the optimum "threshold pressure at no load" for the vehicle's braking circuit. As can be seen in FIG. 1, the cross-sectional area of piston 20 exposed to the fluid pressure level in the chamber 22 is greater than the cross-sectional area of piston 20 exposed to the fluid pessure level in chamber 24. Although the fluid pressure levels in both chambers 22 and 24 are initially equal, due to fluid communication therebetween through the opening between ball 28 and seat 30, a net force acts on the piston 20 urging the latter to the right viewing the drawing due to the area differential across the piston. When this net force acting on the piston exceeds the force acting thereon by springs 50 transmitted by lever 46, the ball 28 closes against seat 30 to initiate metering communication between chambers 24 and 22 in a manner well known to those skilled in the art.

When the load on the axle whose suspension is cooperating with the lever 46 increases, the lever 46 is urged in the direction of the arrow F to increase the stresses generated in springs 50. Since the force generated by springs 50 is transmitted to piston 20 through lever 48, the force differential acting across piston 20 to initiate metering communication between chambers 24 and 22 will also be increased, so that the pressure levels required in chambers 22 and 24 to initiate metering communication therebetween will also be increased.

The force transmitting mechanism 44 described above can be adjusted very easily for different vehicles. Initial setting of the screw 34, generally under conditions of minimum loading on the axle concerned, gives the optimum "threshold pressure at no load" for the braking circuit of the vehicle. The initial setting can be performed in the assembly line, and the device can then be directly mounted on the vehicle without further adjustment.

Other advantages of the device include its very compact construction, due to the use of two levers. In the case of a vehicle in which the relative motion between chassis and suspension elements is considerable under varying load conditions the leverage produced by the two levers enable the travel of the piston and piston rod to be kept very small, even if the levers are themselves small.

Also, due to the shape of the end 80 of the lever 48, the radial component of the force transmitted to the piston rod 40 is virtually zero, so preventing premature wear on the valve.

I claim:

1. A braking pressure regulating device for a vehicle, said vehicle having a fixed portion attached to a chassis and a portion movable relative to the chassis, said device comprising a correcting valve and a force transmitting mechanism;

said correcting valve having a body mounted on one of said vehicle portions, and a movable member;

said force transmitting mechanism exerting on said movable member a force varying in dependence with the relative motion of said vehicle portions, said mehanism comprising a first lever, a second lever and spring means interconnecting said levers;

said first lever being pivotally connected to first anchoring members carried by one portion of the vehicle, said first lever having one end cooperating with the other portion of said vehicle, the other end of said first lever abuttingly engaging said body when the first lever is at rest;

said second lever being pivotally connected to second anchoring members fixed relative to said valve body, and having one end operatively connected to the movable member of said valve;

said first lever controlling said second lever through said spring means to exert on the movable valve member a predetermined force corresponding to a no-load pressure of the braking circuit.

2. A regulating device as claimed in claim 1, wherein the anchoring members are attached to the valve body and arranged symmetrically on either side of the movable valve member.

3. A regulating device as claimed in claim 2, wherein the levers are pressed metal plates, the first lever being pressed substantially into a U-shape, the side walls of the U-shape comprising, firstly, two extensions which, when at rest, abut on the valve body symmetrically on either side of the movable valve and, secondly, two attachments to receive one end of the spring means, and the second lever comprising two tabs to receive the other end of said spring means.

4. A regulating device as claimed in claim 3, wherein the valve comprises a setscrew for presetting the device to give a predetermined no-load threshold pressure under minimum vehicle loading conditions.

* * * * *